June 14, 1960 H. L. VAN ALSTYNE ET AL 2,940,527
PROPELLER PITCH LOCK DISABLING AND FEATHER LOCK MECHANISM
Filed Oct. 25, 1957 2 Sheets-Sheet 1

INVENTORS
HAROLD L. VAN ALSTYNE
MARSHALL B. THORNTON
BY Vernon F. Hauschild
ATTORNEY

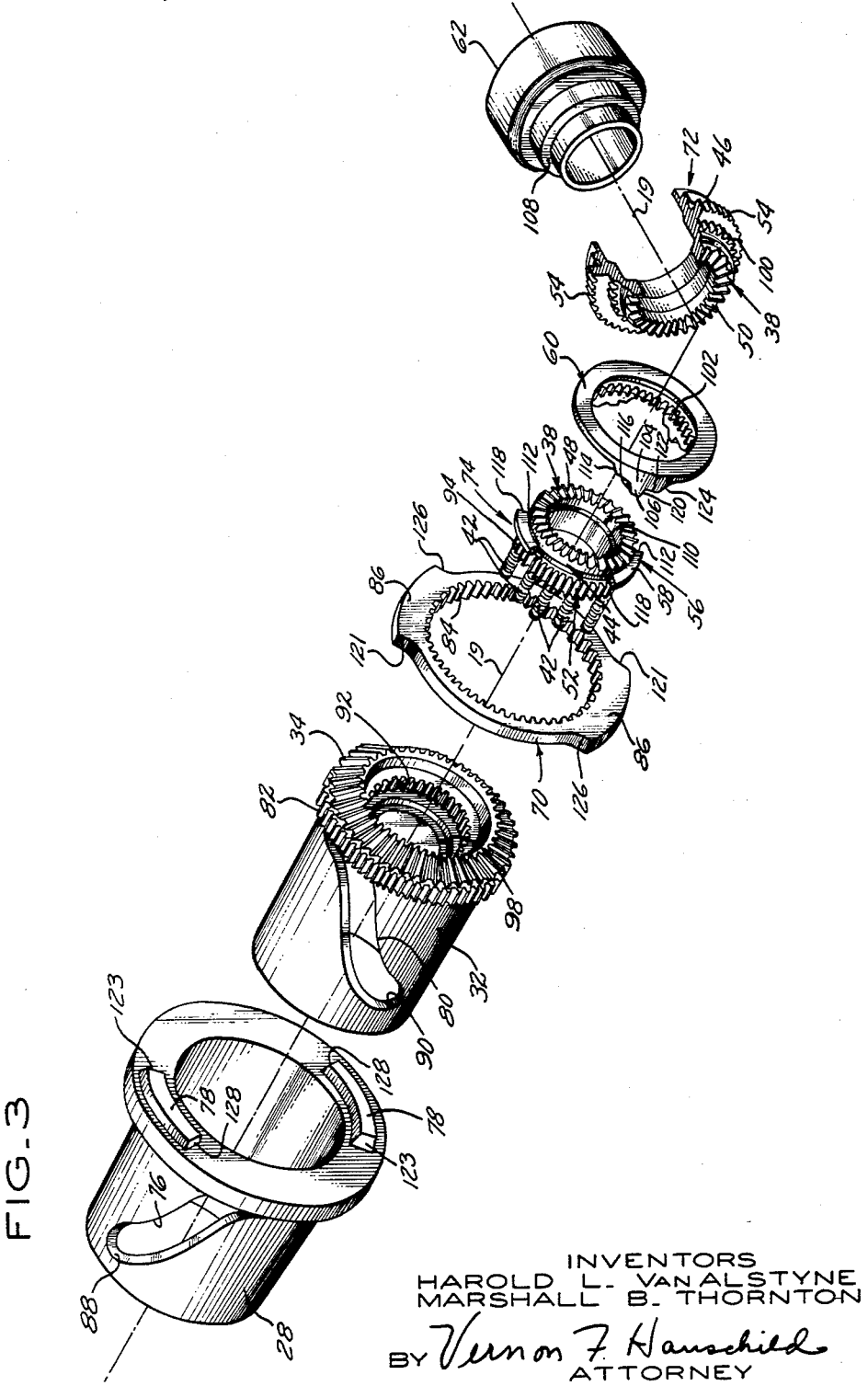

United States Patent Office 2,940,527
Patented June 14, 1960

2,940,527

PROPELLER PITCH LOCK DISABLING AND FEATHER LOCK MECHANISM

Harold L. Van Alstyne, West Hartford, and Marshall B. Thornton, Granby, Conn., assignors to United Aircraft Corporation, East Hartford, Conn., a corporation of Delaware Filed Oct. 25, 1957, Ser. No. 692,385

4 Claims. (Cl. 170—160.32)

This invention relates to variable pitch propellers of the aircraft type and more particularly to the pitch changing mechanism to be used therewith, including mechanism for restraining the propeller blades against pitch reduction.

The pitch of aircraft propeller blades is changed by a pitch change motor, which may be hydraulically operated, possibly in accordance with propeller governor dictates. It is necessary that the propeller blades be rotatable to feather so as to prevent propeller windmilling in flight when not in use and to reverse pitch for aeroplane braking purposes. Feather and reverse pitch are considered as special pitch ranges while the range therebetween constitutes the normal pitch range. Should the pitch change motor be ineffective to change blade pitch as desired, it is important that the blades not be permitted to rotate to the potentially destructive zero pitch position. It is also important that the blades be capable of being rotated toward feather at any time and that no blade pitch change prevention occur at feather and reverse pitch. It is further highly desirable that the blades be locked or restrained in their full feather position for, in flight, aerodynamic loads tend to rotate the blades to the potentially destructive zero degree position.

It is an object of this invention to provide means to prevent propeller blade pitch reduction when the actuating power is lost for any reason and to provide additional means to cause the first means to be made inoperative when the blades are operating in special pitch ranges, namely feather and reverse, which additional means also includes a pitch lock of the friction-spring restraint type in the full feather position.

Further and other advantages will be apparent from the following specification and claims illustrating an embodiment of the invention in which:

Fig. 3 is a perspective exploded view of the important propeller mechanisms used in our invention and arranged to demonstrate the relation and coaction which exists between the various parts. This figure depicts parts of a right-hand tractor propeller.

Figure 1:
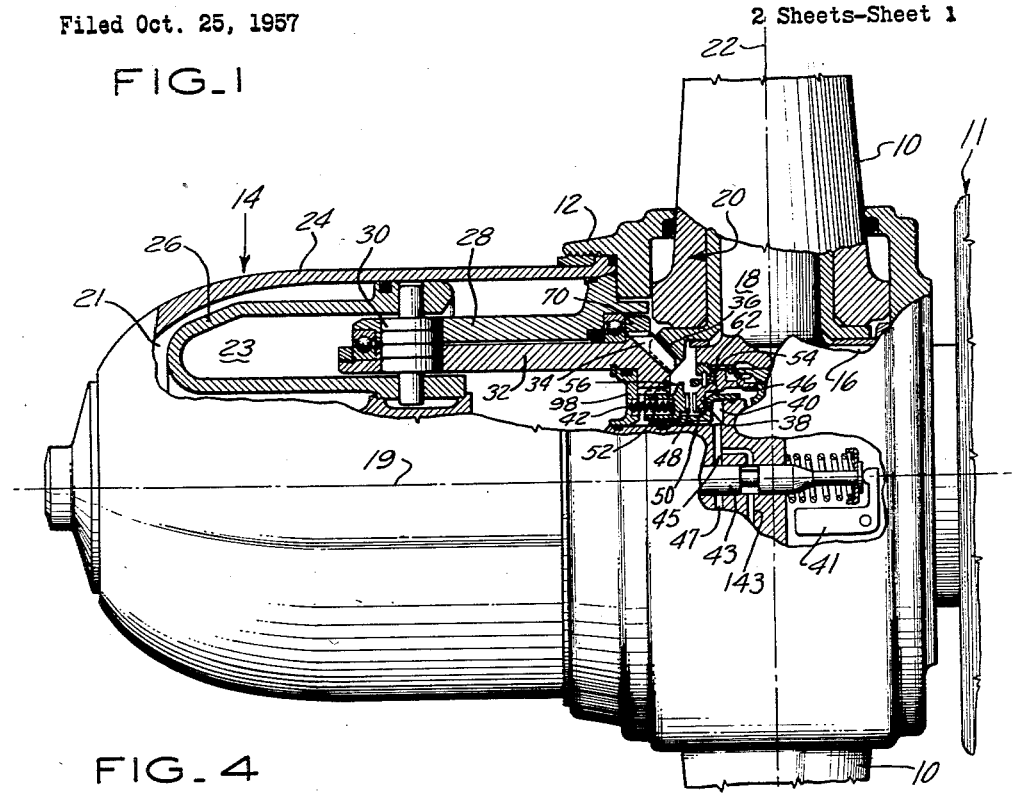
Fig. 1 is an exterior side view, broken away partially in section, to show our invention in the preferred embodiment of a variable pitch aircraft propeller on an aircraft turbojet engine.

Referring to Fig. 1, we see a plurality of propeller blades 10 supported within hub 12 which projects from aircraft engine 11 which may be of any type such as those fully described in U.S. Patent Nos. 2,700,946, 2,711,- 631, and 2,426,879. Pitch change motor 14 is provided to cause blades 10 to rotate with respect to hub 12, thereby changing blade pitch. Propeller blades 10 are supported by spider 16 which carries arms 18 concentrically within the hollow shank 20 of the propeller blades 10. Spider 16, hub 12, blades 10 and pitch change motor 14 rotate about axis 19 to permit propeller blades 10 to perform their propelling function and, independently of the aforementioned rotation, blades 10 are rotatable about their axes 22 with respect to hub 12 so that the pitch of the propeller blades may be changed. Pitch change motor 14 is shown to be hydraulic but could be of any type, such as electrical. Hub 12 carries pitch change motor 14 which comprises dome 24 which serves as a hydraulic cylinder. Double-acting piston 26 is supported within dome 24 to be translatable and rotatable therein in hydraulic piston-cylinder style. Piston 26 is caused to translate with respect to dome 24 by the application of pressurized actuating fluid on either side thereof, namely, the increase pitch side 21 and the decrease pitch side 23. Stationary cam slot or sleeve member 28 is fixed to hub 12 and coacts, through roller or cam follower units 30, with the motion of piston 26 to cause rotatable cam slot or sleeve member 32 to rotate about axis 19. Gear ring 34 is carried by and therefore rotates with member 32. Gear ring 34 engages with gear ring 36, which is attached to propeller blades 10 such that the rotation of member 32 causes the rotation of blades 10 about axis 22, thereby varying blade pitch. This brief description of the propeller in which our invention is being used is believed to be sufficient since the propeller construction is well known and is described in greater particularity in U.S. Patent Nos. 2,280,713 and 2,280,714, to which reference may be made for a more complete description. Further, the pitch change mechanism has been described but briefly since this, too, is well known in the art and is described in greater particularity in U.S. Patent Nos. 2,653,668 and 2,758,659, to which reference may be made for a more complete description.

It is a well-known characteristic of propellers of the aircraft type that, if left to seek their own pitch angle during rotation, the blades would rotate to substantially zero pitch. When at the zero pitch angle, the propeller blades present little or no resistance to rotation and consequently, increase in speed to the possible destruction of the propeller and/or the engine. Further, during flight, an aerodynamic loading may be imposed upon the propeller which additionally tends to cause it to rotate to its zero degree pitch angle. As is well known, for airplane braking purposes upon landing, it is highly desirable to be able to rotate the propeller blades to a reverse pitch angle to effect braking action, and it is well known to be highly desirable to be able to rotate the propeller blades to the full feather pitch when the propeller is inoperative in flight both to prevent drag on the airplane caused by the rotating propeller when allowed to free wheel due to forward motion of the airplane when the engine might be inoperative, and to position the propeller at the pitch angle which causes the least aerodynamic loading toward the potentially destructive zero degree pitch angle.

Under the circumstances in which pitch actuating motor 14 is unable to change or control the pitch angle of propeller blades 10, pitch lock mechanism 38 is provided to prevent a reduction in propeller pitch angle, thereby preventing the propeller from rotating to the aforementioned destructive zero degree angle. Since pitch change motor 14 is hydraulic in actuation, the expected cause of its pitch change ineffectiveness would be failure of the actuating fluid supply to either side 21 or 23 thereof, which may be brought about by a malfunctioning or a result of governor operation. The actuating fluid being directed to either the pitch increase side 21 or the pitch decrease side 23 of motor 14 is also directed into cavity 40 through lines 143 and 45 as fully described in U.S. Patent No. 2,703,148, and the loss of actuating fluid within cavity 40 will permit springs 42 to push rotary pitch lock member 44 in rearward translation to engage stationary pitch lock member 46. Pitch lock unit 38 may be designed to be armed by any propeller malfunction. For example, it is common practice to utilize flyweights 41 to actuate valve 43 to drain cavity 40 by joining line 45 to drain line 47, to arm pitch lock unit 38 in response to propeller overspeed in the fashion fully described in U.S. Patent No. 2,703,148 to which reference may be had.

Figure 4:
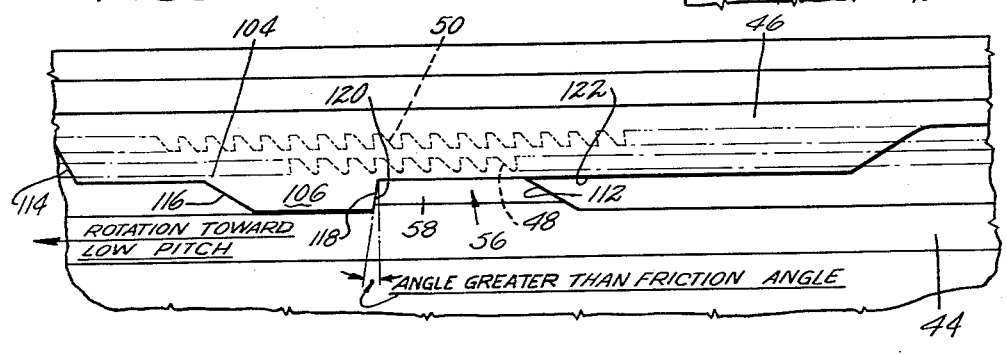
Fig. 4 is a developed view of our pitch lock teeth and our feather latch or lock.

As best shown in Figs. 3 and 4 rotary pitch lock member 44 carries angular or face teeth 48 which mate or cooperate with angular or face teeth 50 of stationary pitch lock member 46 so as to intermesh and prevent rotation between members 44 and 46 in a direction which would permit blades 10 to rotate toward a lesser pitch angle. Angular teeth 48 and 50 are so shaped that rotation between members 44 and 46 is permitted due to a ratcheting action between teeth 48 and 50, in the opposite direction to permit an increase in propeller blade pitch angle.

Figure 2:
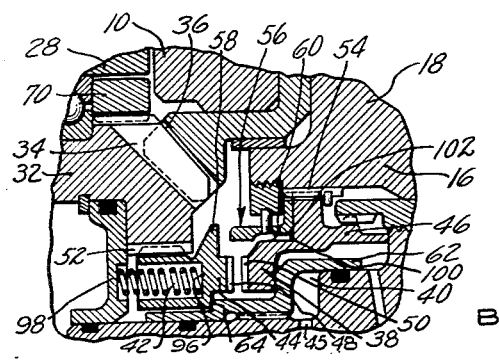
Fig. 2 is a fragmentary, enlarged showing of certain features of the Fig. 1 showing.

Rotatable pitch lock member 44 is connected through engaging axial spline unit 52 (Fig. 2) with rotary pitch change cam member 32 while stationary pitch lock member 46 is attached through a similar spline unit 54 to spider 16.

Due to the angularity of teeth 48 and 50 as shown in Figs. 3 and 4, it will be noted that should these teeth be engaged in the maximum feather position, it would be impossible to disengage the teeth to permit rotation to a lesser pitch angle, for slight rotation toward feather is necessary for tooth disengagement and such is not possible at full feather due to a positive stop to be described hereinafter. Further, because all precaution must be taken to avoid the potentially destructive zero degree pitch angle, it would be undesirable to have pitch lock mechanism 38 engageable at or near this destructive pitch range. Further, the pitch lock is disarmed near the zero degree blade angle as a slight overspeed may occur in normal operation going thru this blade angle on the way to reverse blade angle and if this overspeed actuated the pitch lock further blade motion toward reverse would be prevented. Accordingly, cooperating cam unit 56 is utilized and comprises rotary cam member 58 which is preferably integral with rotary pitch lock member 44 and further comprises stationary cam member 60, which together with stationary pitch lock member 46 is attached to spider 16. Cam unit 56 serves to disengage or keep disengaged the pitch lock member 38 at both of the special pitch ranges of reverse and feather. This disabling or cam-out of pitch lock 38 is caused by cam action of cam unit 56 forcing rotary pitch lock member 44 to translate in a forward direction against the urging of spring 42, thereby disengaging the angular or face teeth 48 and 50 of pitch lock unit 38. Cam unit 56 also serves to friction lock blades 10 at their full feather position in a manner to be described hereinafter in connection with the description of Figs. 3 and 4.

When the propeller is operating satisfactorily in the normal pitch range, that is, between the special feather and reverse pitch ranges, hydraulic actuating fluid which is provided into cavity 40 causes piston 62 (Fig. 2) to translate in a forward direction to abut rotary pitch lock member 44 at surface 64 to cause member 44 to translate forward against the urging of springs 42 thereby disengaging pitch lock unit 38. If, either as a result of overspeed sensitive drain means (see U.S. Patent No. 2,703,-148) or malfunctioning, pressurized hydraulic fluid is no longer present in chamber 40, springs 42 will cause pitch lock unit 38 to engage, thereby preventing propeller blades 10 from rotating to an angle of lesser pitch.

By way of recapitulation prior to a more precise description of the mechanisms involved, pitch change motor 14 through the coaction of piston 26, rollers 30 and the stationary and rotary cam members 28 and 32 causes propeller blades 10 to rotate about axis 22 and thereby change pitch. The pitch of propeller blades 10 may be changed from a maximum feather position, through the special feather range, then through the normal pitch range and then through the special reverse pitch range to the maximum reverse pitch position. Propeller blades 10 may also be actuated by pitch change motor 14 to rotate in the opposite direction through these various ranges from maximum reverse pitch to maximum or full feather. Positive stops (to be described in detail later) are carried on stationary and rotatable cam members 28 and 32 and perform the function of positively and mechanically limiting the relative rotation which may take place between rotary member 32 and stationary member 28, which relative rotation determines the amount of propeller blade pitch change. From a mechanical standpoint, it is highly important that the limits of pitch range be established at points which will prevent rollers 30 from contacting the ends of the cam slots in members 28 and 32. Pitch lock unit 38, which is of the ratchet type, operates in response to propeller overspeed or other malfunctioning and functions to prevent rotation of propeller blades 10 to a decrease pitch position while permitting the blades 10 to be rotated to an increased pitch position. Cooperating cam member 56 coacts with pitch lock unit 38 to inactivate the pitch lock unit 38 in the special feather and reverse pitch ranges. A feather latch or lock, to be described hereinafter, is preferably integrally attached to cooperating cam unit 56 and serves the function of friction or spring plus friction locking the blades 10 in their full feather position. This friction-type feather latch or lock is so chosen that the provision of hydraulic actuating fluid to the decrease pitch side 23 of pitch change motor 14 will overcome the resistance thereof and permit pitch change to a lesser pitch angle.

Referring to Fig. 3, we see an exploded perspective showing of certain important parts of our mechanism to illustrate and explain the coaction and cooperation which exists between these parts permitting us to perform the aforementioned blade pitch change, pitch lock, pitch lock cam-out, and feather lock functions. The left-hand portion of Fig. 3 includes stationary cam slot member 28, rotary cam slot member 32, stop ring 70 and rotary pitch lock and cam member 44 all of which are located in the dome section 24 of pitch change motor 14. The right-hand portion of Fig. 3 shows stationary cam-out member 60 and stationary pitch lock member 46. Parts 60 and 46 are attached to spider 16 which, in turn, is part of hub unit 12. Of the immediately aforementioned parts, cam member 28, cam-out member 60 and pitch lock member 46 are stationary and constitute the parts which combine to make stationary unit 72. Parts 32, 70, and 44 are rotatable and constitute the parts which combine to make rotary unit 74. Stationary cam member 28 is fixed to the propeller hub 12 in any convenient fashion and includes multi-angled cam slot 76 and carries stationary cam stop lugs 78 so as to project in any convenient fashion therefrom. Rotary cam member 32 includes multi-angled cam slot 80, which coacts with stationary cam slot 76 and cam guides or rollers 30 (Fig. 1) to cause rotary cam member 32 to rotate with respect to stationary cam member 28 and hence propeller hub 12. Rotary cam member 32 carries gear teeth 34 at its after end which engage gear teeth 36 (Fig. 1) of propeller 10 to cause propeller 10 to rotate about axis 22 and therefore change pitch angle as rotary cam member 32 rotates relative to stationary cam member 28 and hub 12. Rotary cam member 32 is provided with splines 82 which are machined to receive in cooperating and mating fashion splines 84 of stop ring 70. Stop ring 70 carries lugs 86 which project therefrom and abut stationary cam stop lug 78 to define the maximum limits of relative rotation permitted between stationary cam member 28 and rotary cam mmeber 32. Obviously, by utilizing splines or other connecting means 82 and 84 so as to position stop ring 70 with respect to rotary cam member 32 and/or by proper selection of the width or angularity of stop ring lug 86, the range of relative rotation between parts 28 and 32 and the end points or limits of such rotation may thereby be established as desired. As stated previously, it is highly undesirable from a structural standpoint to have rollers 30 bear against the ends, such as 88 and 90 of cam slots 76 and 80. It will be obvious that by limiting the range of relative rotation and by establishing the end limits of relative rotation anglewise between stationary cam member 28 and rotary cam member 32, we are establishing the same limits with respect to pitch movement or rotation of propeller blades 10. It will further be noted that rotary cam member 32 has splines 92 which coact and mate with corresponding splines 94 of rotary pitch lock member 44 to cause member 44 to rotate with rotary cam member 32. Splines 92 and 94 form spline unit 52 of Figs. 1 and 2. Springs 42 bear against the end surface 96 (Fig. 2) of rotary pitch lock member 44 and also bear against rotary cam slot member 32 either directly or through a bulkhead such as 98 so that member 44 is spring biased away from rotary cam slot member 32 and toward stationary pitch lock member 46. Rotary pitch lock member 44 is shown to include cam lugs 58 projecting therefrom and to further include angular teeth or ratchet members 48 of pitch lock unit 38.

Stationary pitch lock member 46 is provided with splines or other connecting means 54 so that it may be attached to and indexed with respect to spider 16 of propeller hub unit 12. Stationary pitch lock member 46 further includes angular or face teeth or ratchet member 50 which coact and cooperate with angular or face teeth or ratchet member 48 of rotary pitch lock member 44 to prevent pitch reduction when pitch lock unit 38 is engaged. As previously mentioned and as best shown in Fig. 4, the angularity of these teeth is such that pitch reduction is prevented by tooth engagement while pitch increase is permitted through ratcheting action between ratchet members 48 and 50. Stationary pitch lock member 46 is further provided with splines or other connecting means 100 which cooperate or mate with corresponding splines or connecting means 102 of stationary cam-out member 60 of cam unit 56 to position member 60 on stationary pitch lock member 46. Stationary pitch lock cam-out ring 60 includes a plurality of circumferentially equally spaced lugs 104 which project therefrom in a direction substantially perpendicular to the direction which lugs 58 project from rotary pitch lock member 44. Feather latch or lock member 106 projects from stationary cam-out lug 104 such that the cam unit 56 formed by 104 with 106 and 58 performs the dual function of camming-out pitch lock mechanism 38 at the special pitch ranges of feather and reverse pitch and also friction locking blade 10 through rotary unit 74 in its maximum feather position.

Fig. 3 shows three equally spaced cam lugs 58 and 104, and such is done for three-point, anticoking support, but it will be obvious that any number may be used. As noted previously, the actuating hydraulic fluid which is provided to either the increase pitch 21 or decrease pitch 23 side of pitch change motor piston 26 also enters cavity 40 (Fig. 1) to force cylinder 62 to the left or forward such that its surface 108 abuts surface 110 of rotary pitch lock member 44 to overcome the action of springs 42 and disengage pitch lock unit 38, during normal operation. If fluid pitch lock disarming pressure is lost to chamber 40 due to propeller overspeed or if fluid actuating pressure to pitch change motor 14 is lost, it will also be lost in cavity 40 so that springs 42 will be able to push rotary pitch lock member 44 to the right or rearward to cause the angular teeth or ratchet members 48 and 50 of pitch lock mechanism 38 to engage so that rotary unit 74 and hence propeller blade 10 are prevented from decreasing in pitch due to teeth engagement while, should power be recovered temporarily, the ratcheting action in pitch lock unit 38 will permit blades 10, through rotary unit 74, to rotate toward feather. Since pitch locking is undesirable in either the feather or reverse pitch ranges, cooperating cam members 104 and 58 are utilized to cam-out pitch lock unit 38 in these two special pitch ranges, irrespective of the pressure in chamber 40. This occurs as the circumferentially equally spaced cam lugs 58 on rotary pitch lock member 44 rotate in a counterclockwise direction, as shown in Fig. 3, toward feather and surface 112 of rotary pitch lock member 44 contacts angular surface 114 of cam 104 thereby forcing rotary member 44 to the left or forward as surface 112 rides up over surface 114. Such coaction between cam members 104 and 58 serve to cam-out pitch lock unit 38 in feather. Further rotation of member 44 counterclockwise with respect to ring 60 causes lug 58 to ride over surface 116 until the surface opposite the surface 112, namely, surface 118, is caused to engage angular surface 120 of feather latch or lock 106 as springs 42 force cam lugs 58 of rotary unit 44 against surface 122 of cam lug 104. This friction engagement between surfaces 118 and 120 occurs at substantially the same time that surface 121 of rotary positive stop 86 engages surface 123 of stationary positive stop 78 so that the limit of the special feather range and therefore the maximum feather position is thereby established. It will be noted that when blades 10 are in this maximum feather position, they are prevented by positive lock mechanisms 78 and 86 from increasing in pitch and they are prevented by the friction lock engagement between cam lugs 58 with feather lock 106 from rotating toward a lesser pitch.

It will be obvious to those skilled in the art that by indexing parts 70 and lug 106 on 60 with respect to 32 and lug 58 on 44 that the pitch change limits may be varied within the limitations of the basic mechanism and the feather latch operation will be maintained at the proper blade angle and cam position. Stop rings 70 with lugs 86 of varying sizes are necessary to provide changes in the total cam 32 rotational excursion, again within the total cam track 76 and 80 limits.

The angular surface 120 of feather lock 106 with respect to axis 19 is so selected as to the somewhat above the friction angle, taking into account the type of materials used, the pressure forces available, the lubricants in use, and so fourth. The angle of surface 120 is selected to be above the friction angle so that, should hydraulic pressure be restored to the decrease pitch side of pitch change motor 14, the counterclockwise rotation (Fig. 3) of rotary unit 74 caused thereby, would cause cam lugs 58 to ride up over surface 120 and follow feather cam-out surface 116 and 114 toward a reduced pitch position. It should be borne in mind that with actuating fluid now available at pitch change motor 14, it will also be available in cavity 40 so that pitch lock mechanism 38 will be disengaged without regard to cam unit 56. As rotary unit 74 continues to rotate toward decreased pitch angles surface 118 of cam lug 58 will ride up over surface 124 of cam 104 and thence onto surface 122 thereof when pitch change motor 14 and blade 10 get into the reverse pitch range to cam-out pitch lock mechanism 38. Surface 126 of positive stop lug 86 will engage surface 128 of stationary cam stop lug 78 to prevent further relative rotation between rotary unit 74 and stationary unit 72 before surface 118 conacts surface 120.

Although only one embodiment of this invention has been illustrated and described herein, it will be apparent that various changes and modications may be made in the construction and arrangement of the various parts without departing from the scope of this novel concept.

We claim:

1. In a propeller having variable pitch blades, a pitch change mechanism for varying the pitch of said blades through normal pitch range and a feather range which culminates in a full feather blade position, means connecting said blades and said mechanism for locking said blades in pitch when said mechanism malfunctions, first means attached to said mechanism to disable said locking means when said blades are in said feather range, and second means attached to said first means for locking said blades in said full feather blade position while said first means renders said locking means ineffective.

2. In a propeller having variable pitch blades, a pitch change mechanism for varying the pitch of said blades through normal pitch range and a feather range which culminates in a full feather blade position, means connecting said blades and said mechanism to prevent blade pitch change away from said feather range when said mechanism malfunctions, first cam means attached to said mechanism to disable said pitch change preventing means when said mechanism is in said feather range, and second cam means attached to said first cam means for locking said blades in said full feather blade position while said first means renders said pitch change preventing means ineffective.

3. In a propeller having variable pitch blades, a hydraulic pitch change motor for varying the pitch of said blades through normal pitch range and a feather range which culminates in a full feather blade position, locking means connecting said blades and said motor and responsive to propeller malfunction to lock said blades in pitch, and a single cam connected to said locking means to cam out said locking means throughout said feather range and to lock said blades in said full feather blade position.

4. In a rotating propeller having variable pitch blades, first means supporting said blades for pitch change rotation, second means rotatable with respect to said first means and operable therewith to cause said blades to vary in pitch through the normal pitch range and the feather range which culminates in a full feather blade position, hydraulically operated motive means connected to said first and second means to cause rotation of said second means with respect to said first means to cause blade pitch change, positive stop means on said first and second means to establish the limits of pitch change, ratchet means connected to said first and second means and responsive to propeller malfunction to prevent rotation between said first and second means away from said feather range while permitting such rotation toward said feather range, cooperating cam means attached to said first and second means to disable said ratchet means when said blades are in said feather range, and friction means connected to said first and second means and integral with said cam means to prevent rotation of said second means away from said feather range when said blades are at said full feather blade position and while said ratchet means is disabled, which friction means is overcome by the admission of hydraulic operating fluid to said motive means to cause rotation between said first and second means away from said full feather blade position.

References Cited in the file of this patent
UNITED STATES PATENTS

| | | |
|---|---|---|
| 2,703,148 | Pearl | Mar. 1, 1955 |
| 2,791,283 | Lambeck | May 7, 1957 |